US010450901B2

(12) United States Patent
Kobayashi

(10) Patent No.: US 10,450,901 B2
(45) Date of Patent: Oct. 22, 2019

(54) RANKINE CYCLE SYSTEM WHICH RESTRAINS OVER-SPEED OF A TURBINE

(71) Applicant: TOYOTA JIDOSHA KABUSHIKI KAISHA, Toyota-shi, Aichi-ken (JP)

(72) Inventor: Hideo Kobayashi, Mishima (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 13 days.

(21) Appl. No.: 15/552,058

(22) PCT Filed: Feb. 19, 2016

(86) PCT No.: PCT/JP2016/054864
§ 371 (c)(1),
(2) Date: Aug. 18, 2017

(87) PCT Pub. No.: WO2016/136617
PCT Pub. Date: Sep. 1, 2016

(65) Prior Publication Data

US 2018/0252121 A1 Sep. 6, 2018

(30) Foreign Application Priority Data

Feb. 25, 2015 (JP) ................................ 2015-035554

(51) Int. Cl.
*F01K 23/14* (2006.01)
*F01D 21/02* (2006.01)
(Continued)

(52) U.S. Cl.
CPC .............. *F01K 23/14* (2013.01); *F01D 21/02* (2013.01); *F01K 23/065* (2013.01); *F02G 5/04* (2013.01)

(58) Field of Classification Search
CPC ...... F01K 23/101; F01K 23/065; F01K 23/14; F01D 21/02
See application file for complete search history.

(56) References Cited

U.S. PATENT DOCUMENTS 5,121,607 A * 6/1992 George, Jr. ............. F01C 20/04 60/618
5,199,256 A * 4/1993 Moore .................... F01D 13/00 60/39.182
(Continued)

FOREIGN PATENT DOCUMENTS

CN 101243243 A 8/2008
DE 102013213836 A1 1/2015
(Continued)

OTHER PUBLICATIONS

English Translation JPS 623108 A (Year: 1987).*
Ye Tao, "Thermal Power Station", China Electric Power Press, pp. 179-181 (Aug. 2006).

*Primary Examiner* — Mark A Laurenzi
*Assistant Examiner* — Shafiq Mian
(74) *Attorney, Agent, or Firm* — Finnegan, Henderson, Farabow, Garrett & Dunner, LLP

(57) ABSTRACT

In a Rankine cycle system, a part of a liquid-phase heat medium that boils in a heat medium passage of an engine changes to a gas-phase heat medium. The gas-phase heat medium is superheated by a superheater that superheats by heat exchange with exhaust gas of the engine to be superheated steam. The superheated steam that passes through the superheater is blown to a turbine to rotate the turbine, and thereafter is condensed in a condenser. The turbine is connected to an output shaft of the engine by a power transmission pathway, and the power transmission pathway is provided with a clutch mechanism. A turbine outlet valve is provided between the turbine and the condenser, and an ECU closes the turbine outlet valve when the power transmission pathway is disconnected by an action of the clutch mechanism.

6 Claims, 6 Drawing Sheets

(51) Int. Cl.
*F02G 5/04* (2006.01)
*F01K 23/06* (2006.01)

(56) References Cited

U.S. PATENT DOCUMENTS

| | | | | | |
|---|---|---|---|---|---|
| 9,957,845 | B2 * | 5/2018 | Haraguchi | F02G 5/02 | |
| 2009/0211253 | A1 * | 8/2009 | Radcliff | F01K 23/065 | 60/670 |
| 2011/0088397 | A1 * | 4/2011 | Mori | F01K 23/065 | 60/661 |
| 2014/0116051 | A1 * | 5/2014 | Enokijima | F01K 23/10 | 60/660 |
| 2014/0150426 | A1 | 6/2014 | Rewers et al. | | |
| 2014/0165562 | A1 * | 6/2014 | Nagai | F01P 7/165 | 60/615 |
| 2014/0165565 | A1 * | 6/2014 | Shindo | F01K 9/04 | 60/646 |
| 2014/0205889 | A1 * | 7/2014 | Kim | H01M 2/206 | 429/158 |
| 2014/0250886 | A1 * | 9/2014 | Mizoguchi | F01K 23/10 | 60/663 |
| 2014/0290243 | A1 * | 10/2014 | Enokijima | F01K 15/02 | 60/615 |
| 2016/0076403 | A1 | 3/2016 | Haraguchi et al. | | |

FOREIGN PATENT DOCUMENTS

| | | | |
|---|---|---|---|
| JP | 62-3108 | | 1/1987 |
| JP | 2010-101283 | A | 5/2010 |
| JP | 2010-242518 | | 10/2010 |
| JP | 2012-193690 | A | 10/2012 |
| JP | 2013-100807 | | 5/2013 |
| JP | 2013-234662 | | 11/2013 |
| JP | 2014-190326 | | 10/2014 |
| WO | WO 2013-046929 | A1 | 4/2013 |

* cited by examiner

RANKINE CYCLE SYSTEM WHICH RESTRAINS OVER-SPEED OF A TURBINE

CROSS-REFERENCE TO RELATED APPLICATIONS

This application is a national phase application of International Application No. PCT/JP2016/054864, filed Feb. 19, 2016, and claims the priority of Japanese Application No. 2015-035554, filed Feb. 25, 2015, the content of both of which is incorporated herein by reference.

FIELD

The present invention relates to a Rankine cycle system, and particularly relates to a Rankine cycle system that uses waste heat of an internal combustion engine.

BACKGROUND

Conventionally, for example, JP 2010-242518 A has disclosed an art relating to a waste heat recovery device that recovers waste heat of an engine. The waste heat recovery device works as a Rankine cycle system having a heat medium that recovers waste heat of an engine main body as a working fluid, and is configured by a water jacket in which a heat medium passing through an inside recovers waste heat and comes into a vapor state, a turbine that recovers power from the heat medium in a vapor state, and a transmission that transmits the power obtained in the turbine to a crankshaft to be capable of varying speed. The power which is recovered by the turbine is used as auxiliary power for the engine.

CITATION LIST

Patent Literatures

[PTL 1] JP 2010-242518 A
[PTL 2] JP 2013-234662 A

SUMMARY

Technical Problem

In the aforementioned prior art, in the case where it is determined that the turbine rotation speed is not in a region where the Rankine cycle system can be operated safely, the clutch that is provided at the transmission is disengaged and disconnection of the crankshaft and the rotating shaft is performed. However, the turbine rotates by inertia even after the clutch is disengaged. Consequently, when the clutch is disengaged in the process of the turbine rotation speed increasing, there arises a fear that the turbine rotation speed increases by inertia, even after the clutch is disengaged, to overspeed.

The present invention is made in the light of the problem as described above, and an object of the present invention is to provide a Rankine cycle system that can restrain overspeed of a turbine in the Rankine cycle system that transmits rotation of the turbine to an output shaft of an internal combustion engine.

Solution to Problem

In order to attain the above described object, a first invention is a Rankine cycle system, including a boiler that boils a liquid-phase heat medium by waste heat of an internal combustion engine to change the liquid-phase heat medium into a gas-phase heat medium, a superheater that superheats a gas-phase heat medium discharged from the boiler by heat exchange with exhaust gas of the internal combustion engine, a turbine that rotates by receiving supply of the gas-phase heat medium that passed through the superheater, a condenser that condenses the gas-phase heat medium that passed through the turbine and returns the gas-phase heat medium to the liquid-phase heat medium, a control valve that is provided between the turbine and the condenser, a power transmission path that transmits rotation of the turbine to an output shaft of the internal combustion engine, a clutch mechanism that connects or disconnects the power transmission pathway, and a controller that is configured to operate the control valve in a closing direction, when the power transmission pathway is disconnected by an action of the clutch mechanism.

A second invention is such that, in the first invention, the clutch mechanism is configured so that the power transmission pathway is disconnected when an engine speed of the internal combustion engine exceeds an engine speed threshold value.

A third invention is such that, in the first or the second invention, the Rankine cycle system further includes a bypass path that branches from between the boiler and the superheater to join into between the control valve and the condenser, and a bypass valve that is provided in the bypass path, wherein the controller is configured to open the bypass valve when the controller operates the control valve in the closing direction.

A fourth invention is such that, in any one of the first to the third inventions, the Rankine cycle system further includes a turbine rotation speed acquiring device that acquires a rotation speed of the turbine, wherein the controller is configured to adjust an opening degree of the control valve so that the rotation speed of the turbine comes close to a turbine rotation speed threshold value, when the power transmission pathway is disconnected by the action of the clutch mechanism.

A fifth invention is such that, in any one of the first to the third inventions, the Rankine cycle system further includes an inlet pressure acquiring device that acquires an inlet pressure that is a steam pressure of a gas-phase heat medium at an inlet side of the turbine, and an outlet pressure acquiring device that acquires an outlet pressure that is a steam pressure of a gas-phase heat medium at an outlet side of the turbine, wherein the controller is configured to calculate an output of the turbine from the inlet pressure and the outlet pressure, calculate a fluid friction resistance by blades of the turbine from the outlet pressure, and operate the control valve so that a ratio of the fluid friction resistance to the output of the turbine comes close to a predetermined target ratio when the power transmission pathway is disconnected by the action of the clutch mechanism.

Advantageous Effects of Invention

According to the first invention, the control valve is provided between the turbine and the condenser of the Rankine cycle system. The control valve is operated in the closing direction in the case of the power transmission circuit being disconnected by the action of the clutch mechanism. When the control valve is operated in the closing direction, a steam density in the turbine becomes high, and thereby the rotation resistance of the turbine increases. Consequently, according to the present invention, it becomes possible to restrain overspeed of the turbine effectively when the power transmission circuit is disconnected by the action of the clutch mechanism.

According to the second invention, the clutch mechanism is configured so that the power transmission pathway is disconnected when the engine speed of the internal combustion engine exceeds the engine speed threshold value. Consequently, according to the present invention, the turbine rotation speed can be prevented from being higher than the turbine rotation speed that corresponds to the engine speed threshold value.

According to the third invention, the bypass valve controller is configured so that the bypass valve opens when the control valve is operated in the closing direction. Consequently, according to the present invention, steam that is introduced into the turbine can be caused to escape through the bypass valve, and therefore, it becomes possible to restrain excessive increase in the steam pressure at the turbine inlet side effectively.

According to the fourth invention, the opening degree of the control valve is adjusted so that the rotation speed of the turbine comes close to the turbine rotation speed threshold value when the power transmission circuit is disconnected. Consequently, according to the present invention, it becomes possible to restrain overspeed of the turbine, and enhance the turbine rotation speed in preparation for the case of connecting the power transmission pathway.

According to the fifth invention, the inlet side steam pressure that is the steam pressure of the gas-phase heat medium at the turbine inlet side, and the outlet side steam pressure that is the steam pressure of the gas-phase heat medium at the turbine outlet side are acquired. The turbine output is calculated based on the inlet side stream pressure and the outlet side stream pressure which are acquired, and the fluid friction resistance by the blades of the turbine is calculated based on the outlet side steam pressure. Subsequently, the opening degree of the control valve is controlled so that the ratio of the fluid friction resistance to the turbine output which is calculated comes close to the predetermined target ratio. In a state in which the turbine output and the fluid friction resistance are balanced with each other, the turbine rotation speed is kept constant. Consequently, according to the present invention, it becomes possible to restrain overspeed of the turbine, and enhance the turbine rotation speed in preparation for smooth reconnection of the power transmission pathway.

DESCRIPTION OF EMBODIMENTS

Embodiment 1

Embodiment 1 of the present invention will be described with reference to the drawings. Note that common elements in the respective drawings will be assigned with the same reference signs and redundant explanation will be omitted. Further, the present invention is not limited by embodiments as follows.

[Configuration of Embodiment 1]

Figure 1:
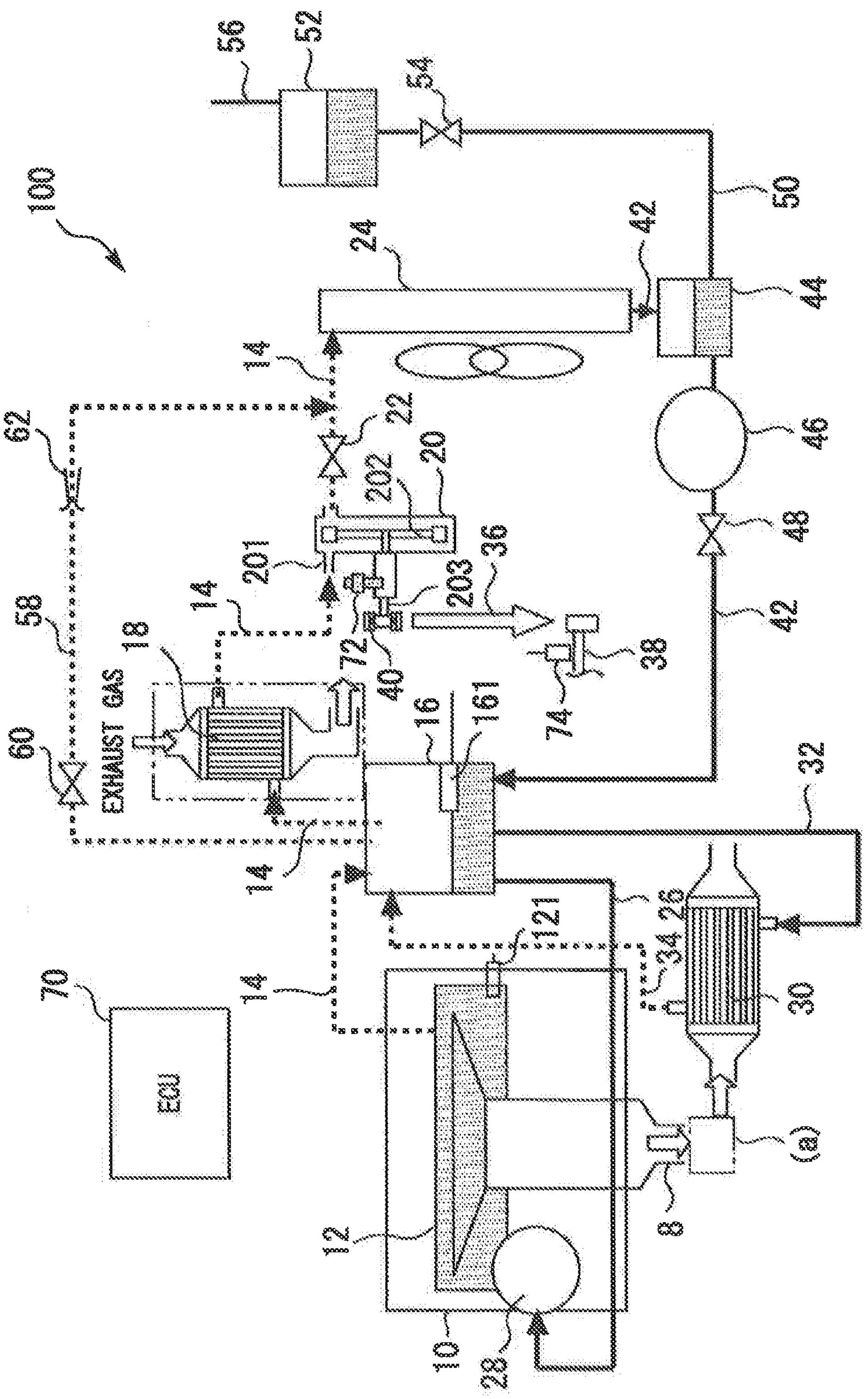
FIG. 1 is a diagram schematically illustrating an internal combustion engine in which a Rankine cycle system of embodiment 1 of the present invention is incorporated.

FIG. 1 is a diagram schematically illustrating an internal combustion engine in which a Rankine cycle system of embodiment 1 of the present invention is incorporated. A Rankine cycle system 100 is equipped with a heat medium passage 12 that is formed inside an internal combustion engine (hereunder, also referred to as an “engine”) 10. The heat medium passage 12 includes a water jacket that is formed in a cylinder block and a cylinder head of the engine 10. A water temperature sensor 121 is attached to the heat medium passage 12. The engine 10 is cooled by boiling a heat medium that flows through an inside of the heat medium passage 12 by heat of the engine 10 and evaporating a part of the heat medium. That is, the heat medium passage 12 functions as a boiler that boils the heat medium by waste heat of the engine 10 and changes a liquid-phase heat medium to a gas-phase heat medium. A configuration of the heat medium passage 12 is not specially limited as long as the heat medium passage 12 is a passage that can pass through an inside of the engine 10. Further, a kind of the heat medium that is caused to flow through the heat medium passage 12 is not specially limited as long as the heat medium boils by heat reception from the engine 10.

A first gas-phase heat medium path 14 is connected to the heat medium passage 12. The first gas-phase heat medium path 14 is a path for leading out the heat medium that receives waste heat of the engine 10 in the heat medium passage 12 to an outside of the engine 10, and is configured by a tube or a hose that can resist a high temperature and a high pressure. In the first gas-phase heat medium path 14, a gas-liquid separator 16, a superheater 18, a turbine 20 and a turbine outlet valve 22 are disposed in sequence from a side near to the engine 10. A condenser 24 is connected to an end portion of the first gas-phase heat medium path 14.

The gas-liquid separator 16 is for separating the heat medium that is led out from the heat medium passage 12 in the engine 10 into a gas-phase heat medium and a liquid-phase heat medium. The gas-phase heat medium that is separated in the gas-liquid separator 16 is fed to the superheater 18 that is provided at a further downstream side in the first gas-phase heat medium path 14. The liquid-phase heat medium that is separated in the gas-liquid separator 16 is stored in the gas-liquid separator 16. A first liquid-phase heat medium path 26 is connected to a lower end of the gas-liquid separator 16. The first liquid-phase heat medium path 26 is connected to the heat medium passage 12 inside the engine 10. The first liquid-phase heat medium path 26 is provided with a first water pump 28. The first water pump 28 is configured as a mechanical pump with a crankshaft included by the engine 10 as a drive source. Note that as for the first water pump 28, an electrically-driven centrifugal pump can be also adopted. When the first water pump 28 is operated, a part of the liquid-phase heat medium that is stored in the gas-liquid separator 16 is fed to the heat medium passage 12 via the first liquid-phase heat medium path 26. The gas-liquid separator 16 is provided with a liquid level sensor 161. The liquid level sensor 161 is for monitoring excess and deficiency of the liquid-phase heat medium that is stored in the gas-liquid separator 16.

Further, the Rankine cycle system 100 is equipped with an exhaust heat steam generator 30. The exhaust heat steam generator 30 is disposed midway in an exhaust path 8 of the engine 10. The liquid-phase heat medium is introduced into the exhaust heat steam generator 30 via a second liquid-phase heat medium path 32 that is connected to a lower end of the gas-liquid separator 16. The introduced liquid-phase heat medium is superheated and boils by heat exchange with exhaust gas in the exhaust path 8, and a part of the heat medium becomes steam. That is, the exhaust heat steam generator 30 functions as a boiler that boils the heat medium by waste heat of the engine 10 and changes the heat medium to the gas-phase heat medium from the liquid-phase heat medium. The gas-phase heat medium that becomes steam is led out via a second gas-phase heat medium path 34 and is returned to the gas-liquid separator 16 again.

The superheater 18 is disposed in the exhaust path 8 (a site of (a) in FIG. 1) at an upstream side of the exhaust heat steam generator 30. The gas-phase heat medium that is introduced into the superheater 18 from the first gas-phase heat medium path 14 is further superheated by heat exchange with the exhaust gas in the exhaust path 8 to be superheated steam. The superheated steam is introduced into the turbine 20 which is further downstream in the first gas-phase heat medium path 14. The turbine 20 is configured by including a turbine nozzle 201 that decompresses the superheated steam that is introduced from the first gas-phase heat medium path 14, and a turbine rotary shaft 203 to which a plurality of turbine blades 202 are fixed. The superheated steam that is introduced into the turbine 20 is decompressed in the turbine nozzle 201 and is blown to the turbine blades 202. The superheated stream is blown to the turbine blades 202, whereby the turbine rotary shaft 203 rotates.

The turbine rotary shaft 203 of the turbine 20 is connected to a crankshaft 38 as the output shaft of the engine 10 via a power transmission pathway 36 such as a speed reducer. A clutch mechanism 40 for connecting or disconnecting the power transmission pathway 36 is provided halfway in the power transmission pathway 36. The clutch mechanism 40 is configured as an electromagnetic clutch capable of connecting or disconnecting the power transmission pathway 36 by an electrical signal. Further, the Rankine cycle system is provided with a turbine rotation sensor 72 for detecting a rotation speed Nt of the turbine rotary shaft 203, and a crank angle sensor 74 for detecting a rotation speed Ne of the crankshaft 38.

The turbine outlet valve 22 functions as a control valve that adjusts an opening degree of the first gas-phase heat medium path 14 between the turbine 20 and the condenser 24. When the turbine outlet valve 22 is controlled to a closing side, a steam density in the turbine 20 can be increased with this.

The condenser 24 functions as a condenser that condenses the gas-phase heat medium that passed through the turbine 20 to return the gas-phase heat medium to a liquid-phase heat medium. One end of a third liquid-phase heat medium path 42 is connected to a lower end of the condenser 24. In the third liquid-phase heat medium path 42, a catch tank 44, a second water pump 46 and a first on-off valve 48 are disposed in sequence from a side near to the condenser 24. An end portion of the third liquid-phase heat medium path 42 is connected to a lower end of the gas-liquid separator 16.

The gas-phase heat medium that is introduced into the condenser 24 from the turbine 20 via the first gas-phase heat medium path 14 is condensed in the condenser 24 to return to the liquid-phase heat medium, and is temporarily stored in the catch tank 44. The second water pump 46 is an electrically-driven pump for feeding the liquid-phase heat medium stored in the catch tank 44 to the gas-liquid separator 16 via the third liquid-phase heat medium path 42. Drive of the second water pump 46 is controlled based on an output signal of the liquid level sensor 161 so that no excess or deficiency occurs to the liquid-phase beat medium that is stored in the gas-liquid separator 16. Further, the first on-off valve 48 is a valve that is opened and closed in response to start and stop of drive of the second water pump 46. The first on-off valve 48 is closed in a period in which the second water pump 46 stops, whereby a backflow of the liquid-phase heat medium to a side of the catch tank 44 is prevented.

A lower end of the catch tank 44 is connected to a lower end of a reserve tank 52 via a fourth liquid-phase heat medium path 50. A second on-off valve 54 is provided halfway in the fourth liquid-phase heat medium path 50. An upper pipe 56 having an end portion opened to the atmosphere is connected to an upper end of the reserve tank 52.

Further, the Rankine cycle system 100 is equipped with a bypass path 58 that connects an upper end of the gas-liquid separator 16 and a spot between the turbine outlet valve 22 and the condenser 24 in the first gas-phase heat medium path 14. The bypass path 58 is provided with a bypass valve 60 and a bypass nozzle 62 in sequence from a side near to the gas-liquid separator 16. When the bypass valve 60 is opened, the gas-phase heat medium in the gas-liquid separator 16 is introduced into the bypass nozzle 62. The introduced gas-phase heat medium is introduced into the condenser 24 after being decompressed at the time of passing through the bypass nozzle 62. Thereby, a steam pressure at an inlet side of the turbine 20 in the first gas-phase heat medium path 14 is decompressed. The bypass path 58 can be a path that bypasses the superheater 18, the turbine 20 and the turbine outlet valve 22 from the first gas-phase heat medium path 14, and does not necessarily have to be connected to the upper end of the gas-liquid separator 16. That is, the bypass path 58 can be configured as a path that branches from a spot between the heat medium passage 12 and the superheater 18 in the first gas-phase heat medium path 14 and joins the spot between the turbine outlet valve 22 and the condenser 24.

Further, the Rankine cycle system 100 is equipped with an ECU (Electronic Control Unit) 70 as a controller. The ECU 70 is equipped with at least an input-output interface, a memory and a central processing unit (CPU). The input-output interface is provided to take in sensor signals from various sensors that are attached to the Rankine cycle system 100 or the engine 10 on which the Rankine cycle system 100 is mounted, and output operation signals to various actuators included by the Rankine cycle system 100. The sensors from which the ECU 70 takes in the signals include various sensors for acquiring an engine operation state such as the crank angle sensor 74, in addition to the turbine rotation sensor 72, the water temperature sensor 121 and the liquid level sensor 161 described above. The actuators to which the ECU 70 issues the operation signals include various actuators for controlling an operation of the engine 10, in addition to the turbine outlet valve 22, the bypass valve 60, the first on-off valve 48, the second on-off valve 54, the clutch mechanism 40, the first water pump 28 and the second water pump 46 described above. In the memory, various control programs, maps and the like are stored. The CPU reads and executes the control program or the like from the memory, and generates the operation signals of various actuators based on the sensor signals that are taken in.

[Operation of Embodiment 1]

Next, a basic operation of the engine 10 equipped with the Rankine cycle system 100 of embodiment 1 will be described. Note that in FIG. 1, flows of the liquid-phase heat medium are expressed by thick solid lines, and flows of the gas-phase heat medium (steam) is expressed by thick broken lines.

The Rankine cycle system 100 of embodiment 1 recovers energy by the waste heat of the engine 10 as rotational energy of the turbine 20, and assists in rotation of the output shaft of the engine 10. First, the Rankine cycle that is realized in the Rankine cycle system 100 will be described. The heat medium passage 12 and the exhaust heat steam generator 30 function as a boiler that receives the waste heat of the engine 10 and boils the liquid-phase heat medium. When the liquid-phase heat medium boils, a part of the liquid-phase heat medium changes into the gas-phase heat medium (steam). The gas-phase heat medium that is generated in the heat medium passage 12 is introduced into the gas-liquid separator 16 via the first gas-phase heat medium path 14. Further, the gas-phase heat medium generated in the exhaust heat steam generator 30 is introduced into the gas-liquid separator 16 via the second gas-phase heat medium path 34. The gas-phase heat medium in the gas-liquid separator 16 is introduced into the superheater 18 via the first gas-phase heat medium path 14. The gas-phase heat medium further receives the exhaust heat of the engine 10 in a process of passing through the superheater 18, and thereby changes to superheated steam with a higher temperature and higher pressure. The superheated steam that passes through the superheater 18 is introduced into the turbine 20 via the first gas-phase heat medium path 14.

In the turbine 20, the introduced superheated steam is decompressed and expanded by the turbine nozzle 201, and thereafter is blown to the turbine blades 202. Thereby, heat energy of the superheated steam is taken out as a rotational motion of the turbine 20. The low-pressure gas-phase heat medium that passes through the turbine 20 is introduced into the condenser 24 via the first gas-phase heat medium path 14. The introduced gas-phase heat medium is cooled in the condenser 24 to change to a liquid-phase heat medium, and is primarily stored in the catch tank 44 via the third liquid-phase heat medium path 42. When deficiency of the liquid-phase heat medium in the gas-liquid separator 16 is detected by the liquid level sensor 161, the second water pump 46 is driven, and the liquid-phase heat medium in the catch tank 44 is introduced into the gas-liquid separator 16 via the third liquid-phase beat medium path 42.

When the Rankine cycle is realized by the Rankine cycle system 100 in this way, the waste heat of the engine 10 is converted into the rotational energy of the turbine 20. The turbine rotary shaft 203 is connected to the crankshaft 38 via the power transmission pathway 36 and the clutch mechanism 40. Consequently, the rotational energy of the turbine 20 is directly used in rotation of the crankshaft 38 by engaging the clutch mechanism 40. Thereby, energy efficiency of the entire system can be enhanced, and therefore enhancement in fuel efficiency can be expected.

Next, a characteristic operation of the Rankine cycle system 100 of embodiment 1 will be described. The turbine rotation speed with high turbine efficiency is several ten thousands rpm/min., and therefore a reduction ratio R of the speed reducer included by the power transmission pathway 36 is set so that efficiency of the turbine 20 becomes high in a practical region of an engine speed. Consequently, when the engine speed of the engine 10 reaches a speed in a high rotation region that is rarely used practically, the rotation speed of the turbine 20 becomes excessively high, and durability, noise, vibration and the like of the turbine become problems. Thus, in the Rankine cycle system 100 of embodiment 1, in a case where the engine speed Ne of the engine 10 becomes higher than a practical upper limit engine speed Nemax, the clutch mechanism 40 is disengaged to disconnect the power transmission pathway 36.

However, even when the power transmission pathway 36 is disconnected by an operation of disengaging the clutch mechanism 40, the overspeed of the turbine 20 is not always prevented reliably. That is, in a case where the engine speed No abruptly increases, and reaches the practical upper limit engine speed Nemax, the turbine rotation speed may increase by rotation acceleration of the turbine 20 even after the power transmission pathway 36 is disconnected. In the case like this, there arises a fear that the turbine 20 overspeeds.

Thus, in the Rankine cycle system 100 in embodiment 1, the turbine outlet valve 22 is disposed at an outlet side of the turbine 20, and the turbine outlet valve 22 is closed when the clutch mechanism 40 is disengaged and the power transmission pathway 36 is disconnected. When the turbine outlet valve 22 is closed, a steam density in the turbine 20 increases, and therefore, resistance of fluid friction to the turbine blades 202 abruptly increases. Consequently, if the turbine outlet valve 22 is closed with disengagement of the clutch mechanism 40, the turbine rotation speed is reliably reduced, and overspeed can be restrained.

When the superheated steam continues to be supplied from the superheater 18 while the clutch mechanism 40 is disengaged and the turbine outlet valve 22 is closed, the steam pressure at the inlet side of the turbine 20 increases. Thus, in the Rankine cycle system 100 of embodiment 1, in a case where the clutch mechanism 40 is disengaged, the turbine outlet valve 22 is closed and the bypass valve 60 is opened. When the bypass valve 60 is opened, the gas-phase heat medium in the gas-liquid separator 16 passes through the bypass path 58 and is introduced into the bypass nozzle 62. The gas-phase heat medium is decompressed at a time of passing through the bypass nozzle 62, and is introduced into the first gas-phase heat medium path 14 between the turbine outlet valve 22 and the condenser 24. That is, when the bypass valve 60 is opened, the gas-phase heat medium in the gas-liquid separator 16 is introduced into the condenser 24 by bypassing the superheater 18, the turbine 20 and the turbine outlet valve 22. Thereby, steam pressure at the inlet side of the turbine 20 can be effectively released.

Further, as described above, in the Rankine cycle system 100 in embodiment 1, in the case where the engine speed No exceeds the practical upper limit engine speed Nemax, the clutch mechanism 40 is disengaged and the turbine outlet valve 22 is closed. In a period in which the turbine outlet valve 22 is closed, the steam density inside the turbine 20 increases, and with this, the turbine rotation speed Nt reduces. When the turbine rotation speed Nt is reduced to an extremely low speed, the clutch mechanism 40 cannot be smoothly engaged thereafter, when the engine speed Ne reduces to the practical upper limit engine speed Nemax and the clutch mechanism 40 is engaged again, and the turbine 20 is unlikely to assist in engine rotation effectively.

Thus, in the Rankine cycle system 100 in embodiment 1, in the case where the clutch mechanism 40 is disengaged, the turbine rotation speed Nt is controlled based on the opening degree of the turbine outlet valve 22. In more detail, when the clutch mechanism 40 is disengaged, overspeed of the turbine 20 needs to be restrained, and therefore, the turbine outlet valve 22 is fully closed temporarily. Thereafter, the turbine rotation speed Nt is detected from the signal of the turbine rotation sensor 72, and the opening degree of the turbine outlet valve 22 is feedback-controlled so that the detected turbine rotation speed Nt comes close to a predetermined practical upper limit turbine rotation speed Ntmax. The practical upper limit turbine rotation speed Ntmax is a turbine rotation speed in a case where the clutch mechanism 40 is engaged in a state in which the engine speed Ne is the practical upper limit engine speed Nemax. According to the control like this, the turbine rotation speed Nt in the period in which the clutch mechanism 40 is disengaged is controlled to the practical upper limit turbine rotation speed Ntmax, and therefore it becomes possible to engage the clutch mechanism 40 smoothly when the engine speed Ne is reduced to the practical upper limit engine speed Nemax.

The respective functions of the ECU 70 in the Rankine cycle system 100 are realized by a processing circuit. That is, the ECU 70 includes a processing circuit that is configured to operate the turbine outlet valve 22 which is the control valve in a closing direction, open the bypass valve, and adjust the opening degree of the control valve so that the rotation speed of the turbine comes close to a turbine rotation speed threshold value, when the power transmission pathway is disconnected by an action of the clutch mechanism 40. The processing circuit may be exclusive hardware, a CPU (also referred to as a Central Processing Unit, a central processing device, a processing unit, an arithmetic unit, a microprocessor, a microcomputer, a processor, and a DSP) that executes a program stored in the memory.

When the processing circuit is exclusive hardware, the processing circuit corresponds to a single circuit, a composite circuit, a programmed processor, a parallel-programmed processor, ASIC, FPGA or a combination of them. Further, when the processing circuit is the CPU, the respective functions of the ECU 70 is realized by software, firmware, or a combination of software and firmware. The software and the firmware are described as programs, and are stored in the memory. The processing circuit realizes the respective functions by reading and executing the programs stored in the memory. That is, the ECU 70 includes the memory for storing the program by which steps of operating the turbine outlet valve 22 in the closing direction when the power transmission pathway is disconnected by the action of the clutch mechanism 40, opening the bypass valve, and adjusting the opening degree of the control valve so that the rotation speed of the turbine comes close to the turbine rotation speed threshold value are resultantly executed, when the program is executed by the processing circuit. Further, it can be said that these programs cause the computer to execute a procedure and a method of processing that is executed by the ECU 70. Here, nonvolatile or volatile semiconductor memories such as a RAM, a ROM, a flash memory, an EPROM, and an EPPROM correspond to the memory. In this way, the processing circuit can realize the aforementioned respective functions by hardware, software, firmware or a combination of the hardware, software and firmware.

[Specific Processing in Embodiment 1]

Figure 2:
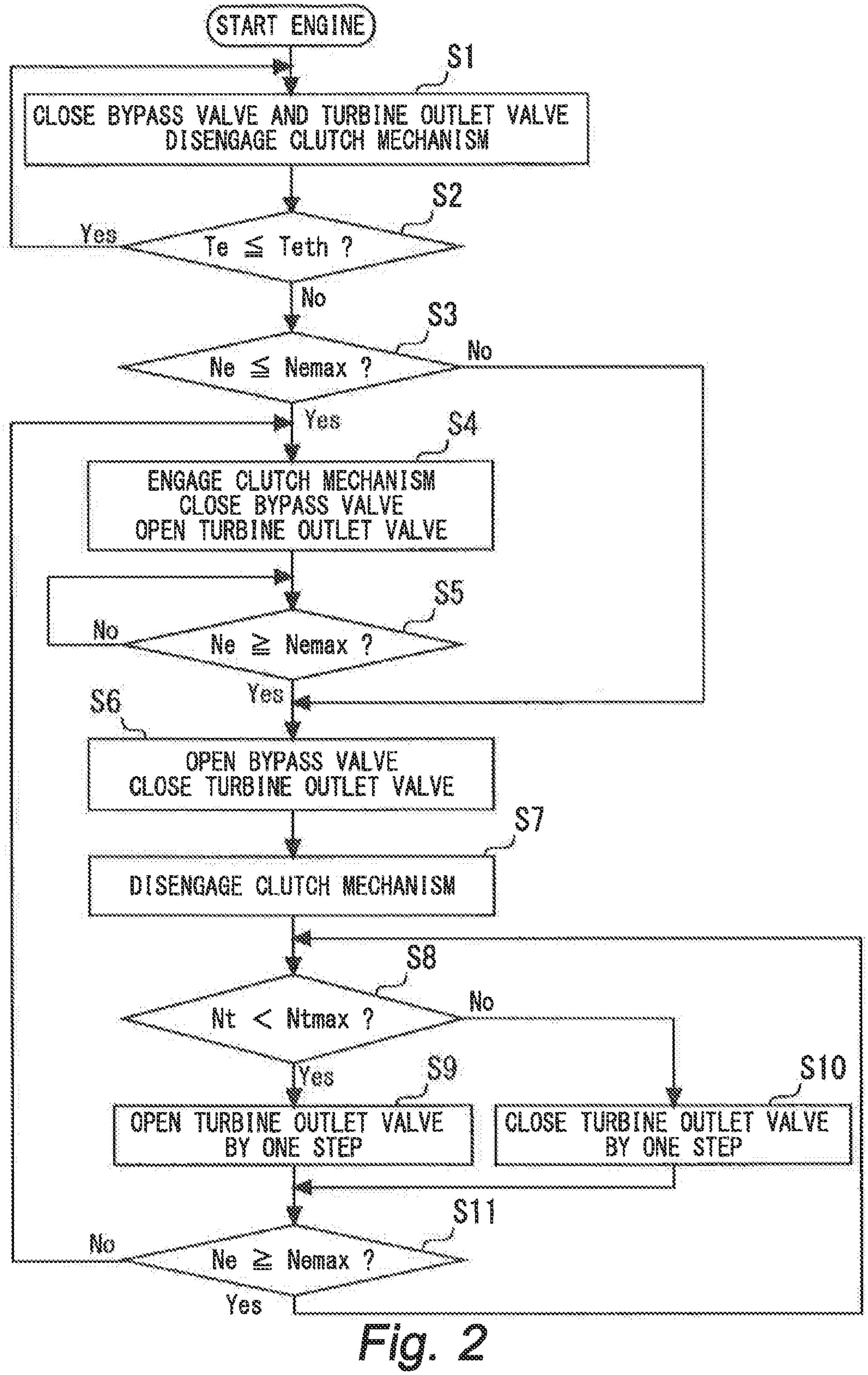
FIG. 2 is a flowchart illustrating control that is executed in embodiment 1 of the present invention.

Next, specific processing of control that is executed in the Rankine cycle system of embodiment 1 will be described. FIG. 2 is a flowchart for explaining control that is executed by the ECU 70 in embodiment 1. Note that the flowchart organizes and expresses, in a single flowchart, a series of processing of the ECU 70 controlling the turbine outlet valve 22, the clutch mechanism 40 and the bypass valve 60 when the engine 10 is started, and does not express a control routine itself that is executed in the ECU 70.

In the flowchart illustrated in FIG. 2, the bypass valve 60 and the turbine outlet valve 22 are closed, and the clutch mechanism 40 is disengaged, when the engine 10 is started first (step S1). Next, it is determined whether or not the water temperature Te of engine cooling water (heat medium) detected by the water temperature sensor 121 is a predetermined warming-up temperature Teth or less (step S2). As for the warming-up temperature Teth, a value that is set in advance as an engine water temperature at which warming-up of the engine 10 is completed is read. When establishment of Te≥Teth is not recognized as a result, it is determined that engine warming-up is not completed yet, and the flow goes to step S1.

When establishment of Te≥Teth is recognized in step S2 described above, it is determined that the heat medium passage 12 functions as the boiler because engine warming-up is completed, the flow goes to a next step, and it is determined whether or not the engine speed Ne which is detected by the crank angle sensor 74 is the predetermined practical upper limit engine speed Nemax or less (step S3). As for the practical upper limit engine speed Nemax, a value that is set in advance is read, as an engine speed at which the turbine rotation speed reaches an upper limit in a state where the clutch mechanism 40 is engaged. When establishment of Ne≤Nemax is recognized as a result, it is determined that there is no fear that the turbine 20 overspeeds even if the clutch mechanism 40 is engaged, the flow goes to a next step, and engagement of the clutch mechanism 40, opening of the turbine outlet valve 22 and closure of the bypass valve 60 are performed (step S4)

Next, it is determined whether or not the engine speed Ne is the predetermined practical upper limit engine speed Nemax or more (step S5). When establishment of Ne≥Nemax is not recognized as a result, it is determined that there is no fear that the turbine 20 overspeeds yet, and processing in the present step S5 is executed again after engagement of the clutch mechanism 40 is continued. When establishment of Ne≥Nemax is recognized in the present step 5, or establishment of Ne≤Nemax is not recognized in step S3 described above, it is determined that there is a fear that the turbine 20 overspeeds in the state in which the clutch mechanism 40 is disengaged, the flow goes to a next step, the turbine outlet valve 22 is closed and the bypass valve 60 is opened (step S6). Next, the clutch mechanism 40 is disengaged (step S7).

Next, it is determined whether or not the turbine rotation speed Nt of the turbine 20 is lower than the practical upper limit turbine rotation speed Ntmax (step S8). The practical upper limit turbine rotation speed Ntmax is the turbine rotation speed corresponding to the practical upper limit engine speed Nemax, and is the rotation speed that satisfies Ntmax=Nemax×R when the speed reduction ratio of the power transmission pathway 36 is set as R. When establishment of Nt<Ntmax is recognized as a result, the turbine outlet valve 22 is controlled to open by one step so that the turbine rotation speed Nt comes close to the practical upper limit turbine rotation speed Ntmax (step S9). When establishment of Nt<Ntmax is not recognized in step S8 described above, the turbine outlet valve 22 is controlled to close by one step so that the turbine rotation speed Nt comes close to the practical upper limit turbine rotation speed Ntmax (step S10).

When the processing in step S9 or step S10 described above is performed, it is determined again whether or not the engine speed Ne is the predetermined practical upper limit engine speed Nemax or more (step S11). When establishment of Ne≥Nemax is recognized as a result, it is determined that there is a fear that the turbine 20 overspeeds when the clutch mechanism 40 is engaged again, and disengagement of the clutch mechanism 40 is continued by returning to the processing in step S8 described above. When establishment of Ne≥Nemax is not recognized in the present step S11, it is determined that there is no fear that the turbine 20 overspeeds even when the clutch mechanism 40 is engaged again, the flow goes to step S4 described above, and the clutch mechanism 40 is engaged again.

As described above, according to the Rankine cycle system 100 in embodiment 1, the turbine outlet valve 22 is closed when the clutch mechanism 40 is disconnected, and therefore, it becomes possible to restrain overspeed of the turbine effectively.

Incidentally, in the system of embodiment 1 described above, the electromagnetic clutch capable of connecting or disconnecting the power transmission pathway 36 by an electrical signal is used as the clutch mechanism 40. The clutch mechanism 40 may be configured as a one-way clutch that transmits a rotational force in only one direction, or another known clutch. This is also applied to a system in embodiment 2 that will be described later.

When a one-way clutch is adopted as the clutch mechanism 40, the clutch mechanism 40 is automatically engaged when the engine speed Ne 5 the turbine rotation speed Nt/the speed reduction ratio R is established, and is automatically disengaged when the engine speed Ne<the turbine rotation speed Nt/the speed reduction ratio R is established. Consequently, processing of disengaging the clutch mechanism 40 in step S7 described above is automatically performed by the turbine outlet valve 22 being closed to reduce the turbine rotation speed in step S6.

Further, in the system of embodiment 1 described above, the Rankine cycle system 100 having the heat medium that recovers the waste heat of the engine 10 as the working fluid is described, but the Rankine cycle system 100 does not necessarily have to have the heat medium flowing in the heat medium passage 12 of the engine 10 as the working fluid. That is, a configuration may be adopted, in which the heat medium of the Rankine cycle system 100 is made a different system from the heat medium of the engine 10, and heat exchange is performed with the heat medium of the engine 10 by a heat exchanger. This is also applied to the system in embodiment 2 that will be described later.

Further, although in the system of embodiment 1 described above, disengagement and engagement of the clutch mechanism 40 are performed based on whether or not the engine speed Ne exceeds the practical upper limit engine speed Nemax, disengagement and engagement of the clutch mechanism 40 may be performed based on whether or not the turbine rotation speed Nt which is detected by the turbine rotation sensor 72 exceeds the practical upper limit turbine rotation speed.

Further, although in the system in embodiment 1 described above, both the heat medium passage 12 and the exhaust heat steam generator 30 are used as the boiler of the Rankine cycle system 100, either one of the heat medium passage 12 or the exhaust heat steam generator 30 may be used. Further, as for the boiler, another known configuration such as a heat exchanger may be used as long as it boils the heat medium of the Rankine cycle by using the waste heat of the engine 10. This is also applied to the system of embodiment 2 that will be described later.

Further, in the system of embodiment 1 described above, the turbine outlet valve 22 is fully closed when the clutch mechanism 40 is disengaged. However, the opening degree of the turbine outlet valve 22 does not have to be full closure, because if the turbine outlet valve 22 is controlled to at least a closing side, the turbine rotation speed can be reduced. This is also applied to the system of embodiment 2 that will be described later.

Note that in the system of embodiment 1 described above, the practical upper limit engine speed Nemax corresponds to an "engine speed threshold value" in a second invention. The practical upper limit turbine rotation speed Ntmax corresponds to a "turbine rotation speed threshold value" in a fourth invention. The turbine rotation sensor 72 corresponds to a "turbine rotation speed acquiring device" in the fourth invention.

Embodiment 2

Next, embodiment 2 of the present invention will be described with reference to the drawings.

[Feature of Embodiment 2]

Figure 3:
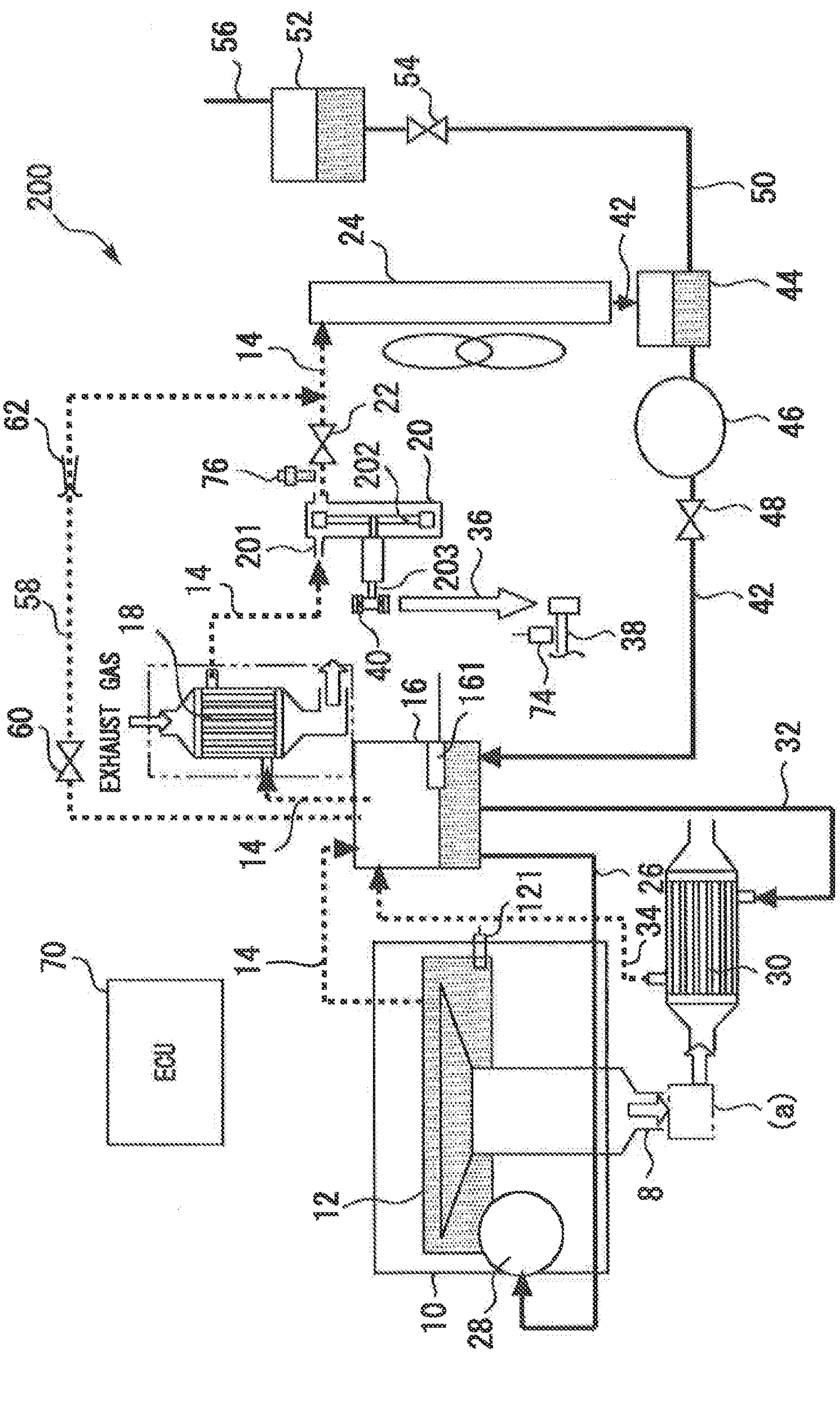
FIG. 3 is a diagram schematically illustrating an internal combustion engine in which a Rankine cycle system of embodiment 2 of the present invention is incorporated.

FIG. 3 is a diagram schematically illustrating an internal combustion engine in which a Rankine cycle system of embodiment 2 of the present invention is incorporated. A Rankine cycle system 200 illustrated in FIG. 3 has a similar configuration to the configuration of the Rankine cycle system 100 illustrated in FIG. 1 described above, except for a point that an outlet pressure sensor 76 is provided in a position between the turbine 20 and the turbine outlet valve 22 in the first gas-phase heat medium path 14, and a point that the Rankine cycle system 200 is not equipped with the turbine rotation sensor 72.

In the Rankine cycle system 100 of embodiment 1 described above, the opening degree of the turbine outlet valve 22 is controlled so that the turbine rotation speed Nt that is detected by the turbine rotation sensor 72 gets close to the practical upper limit turbine rotation speed Ntmax, after the turbine outlet valve 22 is closed and the clutch mechanism 40 is disengaged. In contrast with this, the Rankine cycle system 200 of the present embodiment 2 has a feature in a point that the opening degree of the turbine outlet valve 22 after the clutch mechanism 40 being disengaged is controlled without using the rotation speed information that is obtained by the turbine rotation sensor 72. Hereunder, specific processing of control that is executed in the Rankine cycle system 200 of embodiment 2 will be described in detail in accordance with a flowchart.

[Specific Processing in Embodiment 2]

Figure 4:
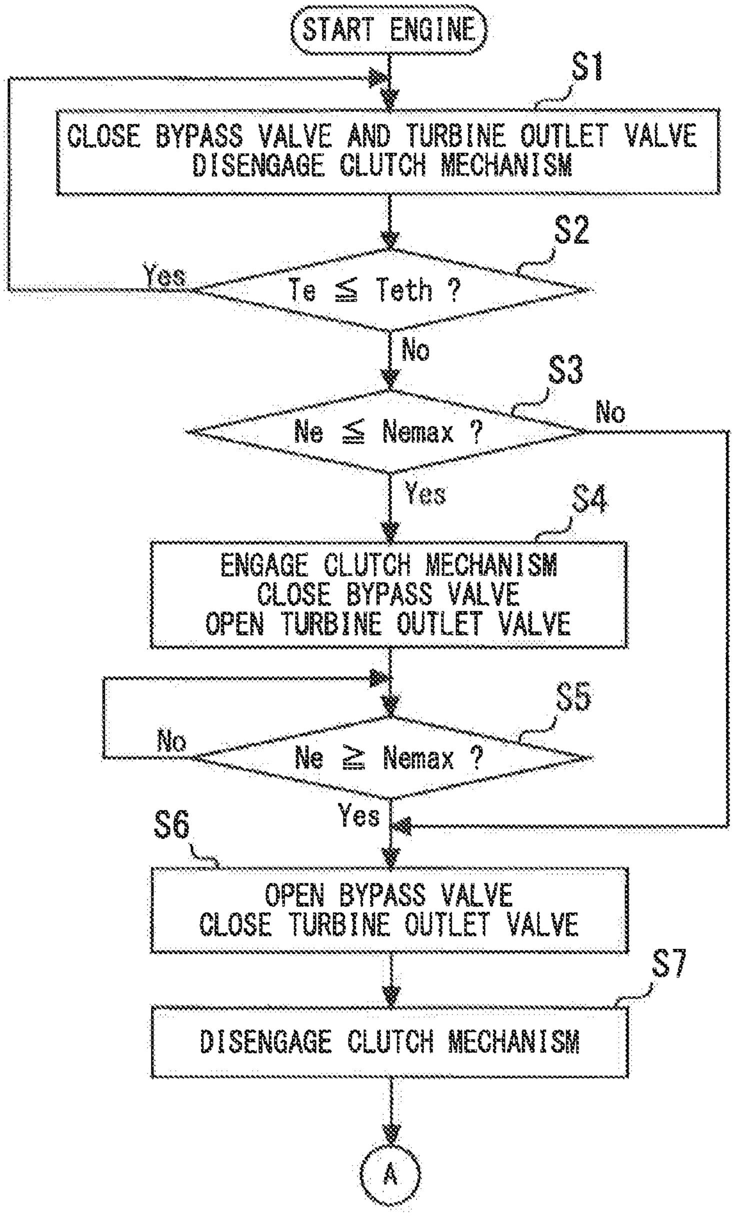
FIG. 4 is a flowchart illustrating a first half part of control that is executed in embodiment 2 of the present invention.
Figure 5:
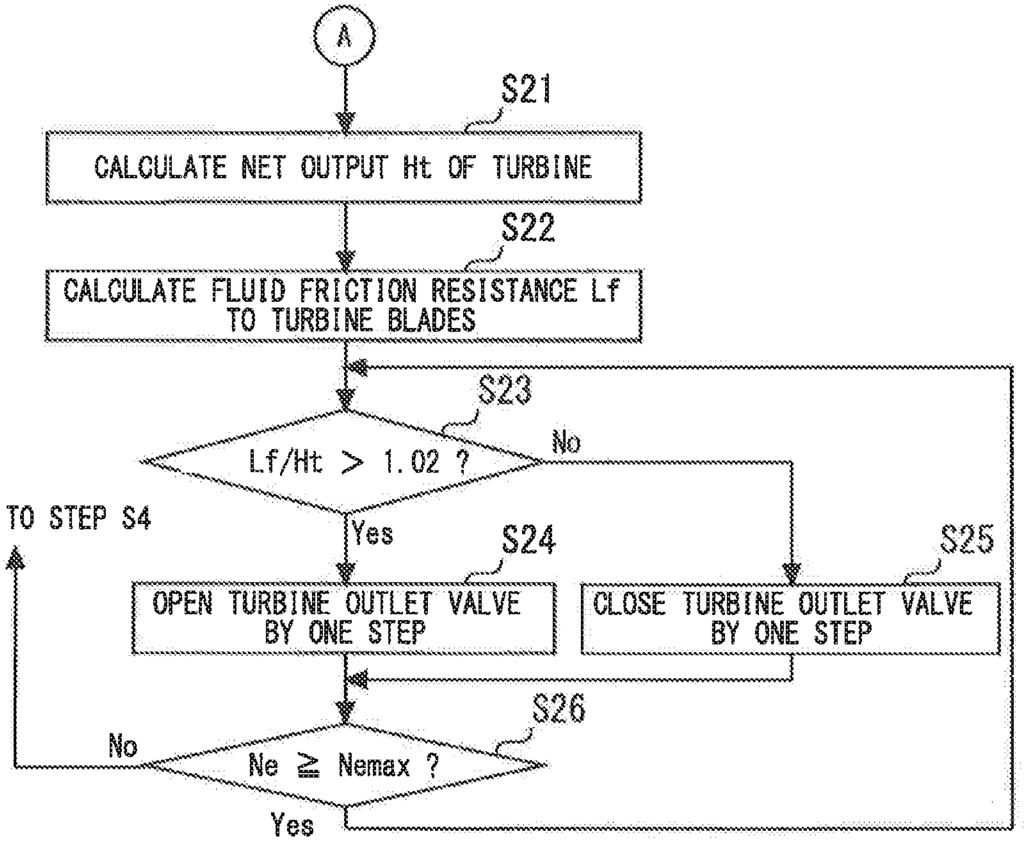
FIG. 5 is a flowchart illustrating a latter half part of the control that is executed in embodiment 2 of the present invention.

FIG. 4 and FIG. 5 are flowcharts for explaining control that is executed by the ECU 70 in embodiment 2, FIG. 4 illustrates a first half part, and FIG. 5 illustrates a latter half part. Note that the flowchart organizes and expresses, in a single flowchart, a series of processing of the ECU 70 controlling the turbine outlet valve 22, the clutch mechanism 40 and the bypass valve 60 when the engine 10 is started, and does not express a control routine itself that is executed in the ECU 70.

In processing of step S1 through step S7 in the flow chart illustrated in FIG. 4, similar processing to step S1 through step S7 in the flowchart illustrated in FIG. 2 is executed. Thereby, when the engine speed Ne reaches the practical upper limit engine speed Nemax or more, closure of the turbine outlet valve 22, opening of the bypass valve 60, and disengagement of the clutch mechanism 40 are performed.

Figure 6:
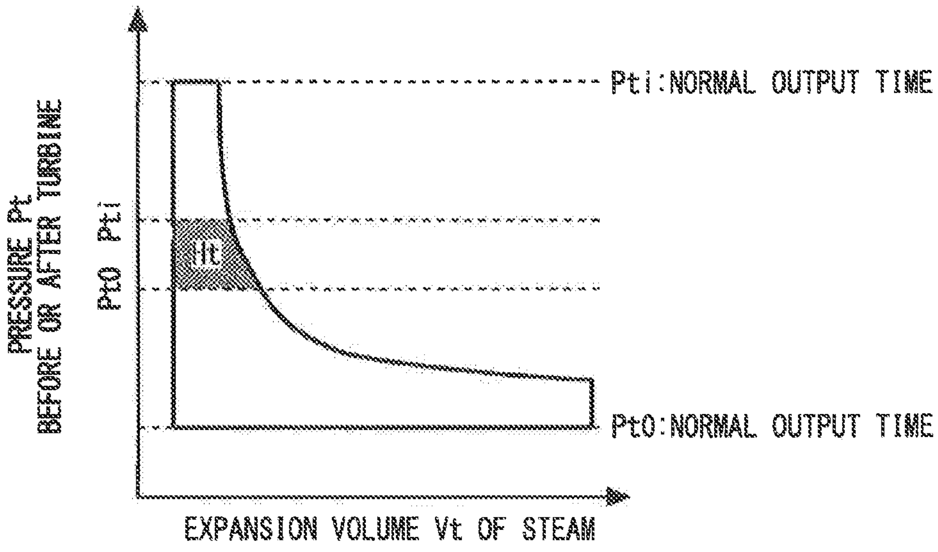
FIG. 6 is a P-V diagram illustrating an output characteristic of a turbine.

When the processing in step S7 is executed, the flow goes to step S21 in the flowchart illustrated in FIG. 5 next. In this step, a net output Ht of the turbine 20 is calculated (step S21). FIG. 6 is a P-V diagram illustrating an output characteristic of the turbine. Note that Pti shown in FIG. 6 represents a pressure (hereunder, referred to as an "inlet pressure") of steam at an inlet side of the turbine nozzle 201. The inlet pressure Pti can be estimated from the water temperature Te of the engine cooling water that is in a proportional relation with the inlet pressure Pti. That is, the ECU 70 has a function as an inlet pressure acquiring device that acquires the inlet pressure Pti by using a detection signal of the water temperature sensor 121. Further, Pt0 shown in FIG. 6 represents a pressure (hereunder, referred to as an "outlet pressure") of steam at an outlet side of the turbine nozzle 201, and can be detected by the outlet pressure sensor 76. That is, the ECU 70 has a function as an outlet pressure acquiring device that acquires the outlet pressure Pt0 by using a detection signal of the outlet pressure sensor 76. The output Ht of the turbine 20 is determined by steam pressures before and after the turbine nozzle 201, as illustrated in FIG. 6. In the present step, the inlet pressure Pti and the outlet pressure Pt0 are estimated or detected, and the net output Ht of the turbine 20 is calculated based on the output characteristic illustrated in FIG. 6.

Next, a fluid friction resistance Lf to the turbine blades 202 is calculated (step S22). As a typical example of the fluid friction resistance to the turbine blades 202, for example, a draft loss, a rotor friction loss and the like are cited. The draft loss and the rotor friction loss can be respectively expressed by relational expressions as follows by using a diameter Dt of the turbine 20, the turbine rotation speed Nt, a height Yt of the turbine blade 202 and a steam density γ.

$$\text{Draft loss} \propto Dt^4 * Nt^3 * Yt^{1.5} * \gamma$$

$$\text{Rotor friction loss} \propto Dt^5 * Nt^3 * \gamma \quad (1)$$

Accordingly, the fluid friction resistance Lf to the turbine blades 202 can be calculated by a relational expression shown in expression (2) as follows. Note that A and B in the expression are proportionality constants.

$$\text{Fluid friction resistance } Lf = A(Dt^4 * Nt^3 * Yt^{1.5}\gamma) + B(Dt^5 * Nt^3 * \gamma) \quad (2)$$

The diameter Dt of the turbine 20 and the height Yt of the turbine blade 202 are characteristic values of the turbine 20, and the proportionality constants A and B can be determined by an actual machine test or the like. Further, as for the turbine rotation speed Nt, for example, the practical upper limit turbine rotation speed Ntmax is used as the turbine rotation speed which is set as a target when the clutch mechanism 40 is disengaged. Further, the steam density γ is calculated by using the outlet pressure Pt0 of the turbine nozzle 201.

Next, it is determined whether or not the fluid friction resistance Lf/the net output Ht is larger than a predetermined target ratio (step S23). The fluid friction resistance Lf/the net output Ht is the ratio that is used to determine whether it is under a condition in which the turbine rotation speed reduces or a condition in which the turbine rotation speed increases, and when the fluid friction resistance Lf/the net output Ht=1 is established, the turbine rotation speed is kept at the practical upper limit turbine rotation speed Ntmax. However, if the fluid friction resistance Lf/the net output Ht<1 is established, there arises a fear that the turbine rotation speed increases to overspeed, so that in the present step, the target ratio is set at 1.02 that is slightly larger than 1. When the opening degree of the turbine outlet valve 22 is controlled so that the fluid friction resistance Lf/net output Ht=1.02 is established in this way, the turbine rotation speed is kept at the rotation speed which is slightly lower than the actual upper limit turbine rotation speed Ntmax.

When establishment of the fluid friction resistance Lf/the net output Ht>1.02 is recognized as a result of the determination in the present step S23, it is determined that the turbine rotation speed becomes lower than the actual upper limit turbine rotation speed Ntmax, the flow shifts to a next step, and the opening degree of the turbine outlet valve 22 is opened by one step (step S24).

When establishment of the fluid friction resistance Lf/the net output Ht>1.02 is not recognized as a result of the determination in step S23 described above, it is determined that there is a possibility of the turbine rotation speed exceeding the practical upper limit turbine rotation speed Ntmax, the flow shifts to a next step, and the opening degree of the turbine outlet valve 22 is closed by one step (step S25).

When the processing in step S24 or step S25 described above is performed, it is determined whether or not the engine speed Ne is the predetermined practical upper limit engine speed Nemax or more again, next (step S26). When establishment of Ne≥Nemax is recognized as a result, it is determined that if the clutch mechanism 40 is engaged again, there is a fear that the turbine 20 overspeeds, and disengagement of the clutch mechanism 40 is continued by returning to the processing in step S23 described above. When establishment of Ne≥Nemax is not recognized in step S26, it is determined that there is no fear that the turbine 20 overspeeds even if the clutch mechanism 40 is engaged again, so that the flow shifts to step S4, and the clutch mechanism 40 is engaged again.

As described above, according to the Rankine cycle system 200 of embodiment 2, the opening degree of the turbine outlet valve 22 is controlled so that the fluid friction resistance Lf/the net output Ht comes close to the target ratio (=1.02) when the clutch mechanism 40 is disengaged. Thereby, the turbine rotation speed can be brought close to the rotation speed set as the target, and therefore reengagement of the clutch mechanism 40 can be smoothly performed.

Incidentally, in the system in embodiment 1 described above, the inlet pressure Pti is estimated from the water temperature Te of the engine cooling water, but the inlet pressure Pti may be directly detected by providing a pressure sensor at the inlet side of the turbine nozzle 201.

Further, although in the system of embodiment 1 described above, the target ratio of the fluid friction resistance Lf/the net output Ht is set as 1.02, the value of the target ratio is not limited to this. That is, another target ratio value may be used if only the turbine rotation speed can be brought close to the practical upper limit turbine rotation speed Ntmax while overspeed of the turbine rotation speed is prevented.

REFERENCE SIGNS LIST

8 Exhaust path
10 Engine
12 Heat medium passage
121 Water temperature sensor
14 First gas-phase heat medium path
16 Gas-liquid separator
161 Liquid level sensor
18 Superheater
20 Turbine
201 Turbine nozzle
202 Turbine blade

203 Turbine rotary shaft
22 Turbine outlet valve
24 Condenser
26 First liquid-phase heat medium path
28 Water pump
30 Exhaust heat steam generator
32 Second liquid-phase heat medium path
34 Second gas-phase heat medium path
36 Power transmission pathway
38 Crankshaft
40 Clutch mechanism
42 Third liquid-phase heat medium path
44 Catch tank
46 Water pump
48 First on-off valve
50 Fourth liquid-phase heat medium path
52 Reserve tank
54 Second on-off valve
56 Upper pipe
58 Bypass path
60 Bypass valve
62 Bypass nozzle
70 ECU (Electronic Control Unit)
72 Turbine rotation sensor
74 Crank angle sensor
76 Outlet pressure sensor
100, 200 Rankine cycle system

The invention claimed is:

1. A Rankine cycle system, comprising:

a boiler that boils a liquid-phase heat medium by waste heat of an internal combustion engine to change the liquid-phase heat medium into a gas-phase heat medium;

a superheater that superheats the gas-phase heat medium discharged from the boiler by heat exchange with exhaust gas of the internal combustion engine;

a turbine that rotates by receiving supply of the gas-phase heat medium that passed through the superheater;

a condenser that condenses the gas-phase heat medium that passed through the turbine and returns the gas-phase heat medium to the liquid-phase heat medium;

a control valve that is provided between the turbine and the condenser;

a power transmission pathway that transmits rotation of the turbine to an output shaft of the internal combustion engine;

a clutch mechanism that connects or disconnects the power transmission pathway;

a controller that is configured to operate the control valve in a closing direction, when the power transmission pathway is disconnected by an action of the clutch mechanism;

a bypass path that branches from between the boiler and the superheater to join into between the control valve and the condenser; and a bypass valve that is provided in the bypass path, wherein the controller is configured to open the bypass valve when the controller operates the control valve in the closing direction.

2. The Rankine cycle system according to claim 1, wherein the clutch mechanism is configured so that the power transmission pathway is disconnected when an engine speed of the internal combustion engine exceeds an engine speed threshold value.

3. The Rankine cycle system according to claim 1, further comprising:

a turbine rotation sensor that acquires a rotation speed of the turbine, wherein the controller is configured to adjust an opening degree of the control valve so that the rotation speed of the turbine comes close to a turbine rotation speed threshold value, when the power transmission pathway is disconnected by the action of the clutch mechanism.

4. The Rankine cycle system according to claim 1, wherein the controller is configured to calculate an output of the turbine from an inlet pressure that is a steam pressure of a gas-phase heat medium at an inlet side of the turbine and an outlet pressure that is a steam pressure of the gas-phase heat medium at an outlet side of the turbine, calculate a fluid friction resistance by blades of the turbine from the outlet pressure, and operate the control valve so that a ratio of the fluid friction resistance to the output of the turbine comes close to a predetermined target ratio when the power transmission pathway is disconnected by the action of the clutch mechanism.

5. A Rankine cycle system, comprising:

a boiler that boils a liquid-phase heat medium by waste heat of an internal combustion engine to change the liquid-phase heat medium into a gas-phase heat medium;

a superheater that superheats the gas-phase heat medium discharged from the boiler by heat exchange with exhaust gas of the internal combustion engine;

a turbine that rotates by receiving supply of the gas-phase heat medium that passed through the superheater;

a condenser that condenses the gas-phase heat medium that passed through the turbine and returns the gas-phase heat medium to the liquid-phase heat medium;

a control valve that is provided between the turbine and the condenser;

a power transmission pathway that transmits rotation of the turbine to an output shaft of the internal combustion engine;

a clutch mechanism that connects or disconnects the power transmission pathway; and a controller that is configured to operate the control valve in a closing direction, when the power transmission pathway is disconnected by an action of the clutch mechanism, wherein the controller is configured to calculate an output of the turbine from an inlet pressure that is a steam pressure of a gas-phase heat medium at an inlet side of the turbine and an outlet pressure that is a steam pressure of the gas-phase heat medium at an outlet side of the turbine, calculate a fluid friction resistance by blades of the turbine from the outlet pressure, and operate the control valve so that a ratio of the fluid friction resistance to the output of the turbine comes close to a predetermined target ratio when the power transmission pathway is disconnected by the action of the clutch mechanism.

6. The Rankine cycle system according to claim 5, wherein the clutch mechanism is configured so that the power transmission pathway is disconnected when an engine speed of the internal combustion engine exceeds an engine speed threshold value.

* * * * *